United States Patent [19]

Etzbach et al.

[11] Patent Number: 5,789,560
[45] Date of Patent: Aug. 4, 1998

[54] AZO DYES WITH A COUPLING COMPONENT OF THE AMINOTHIAZOLE SERIES

[75] Inventors: Karl-Heinz Etzbach, Frankenthal; Rüdiger Sens, Mannheim, both of Germany

[73] Assignee: BASF Aktiengesellschaft, Ludwigshafen, Germany

[21] Appl. No.: 765,442

[22] PCT Filed: Jul. 20, 1995

[86] PCT No.: PCT/EP95/02866

§ 371 Date: Jan. 22, 1997

§ 102(e) Date: Jan. 22, 1997

[87] PCT Pub. No.: WO96/03462

PCT Pub. Date: Feb. 8, 1996

[30] Foreign Application Priority Data

Jul. 22, 1994 [DE] Germany .................. 44 26 023.7

[51] Int. Cl.⁶ .................. C09B 29/033; C09B 29/36; B41M 5/38
[52] U.S. Cl. .................. 534/752; 534/765; 534/769; 534/795; 502/227; 428/195; 428/913; 428/914
[58] Field of Search .................. 534/752, 765, 534/769, 795; 502/227; 428/195, 913, 914

[56] References Cited

U.S. PATENT DOCUMENTS

| | | | |
|---|---|---|---|
| 4,820,809 | 4/1989 | Bergmann et al. | 534/765 |
| 4,933,226 | 6/1990 | Evans et al. | 428/195 |
| 4,960,873 | 10/1990 | Hansen et al. | 534/765 |
| 5,059,684 | 10/1991 | Lamm et al. | 534/765 |
| 5,132,438 | 7/1992 | Bach et al. | 552/295 |
| 5,158,928 | 10/1992 | Bach et al. | 503/227 |
| 5,216,139 | 6/1993 | Etzbach et al. | 534/765 |
| 5,466,790 | 11/1995 | Gruettner-Merten et al. | 534/765 X |

FOREIGN PATENT DOCUMENTS

| | | |
|---|---|---|
| 151 287 | 12/1984 | European Pat. Off. |
| 362 637 | 8/1989 | European Pat. Off. |
| 390 027 | 3/1990 | European Pat. Off. |
| 399 473 A1 | 5/1990 | European Pat. Off. |
| 400 451 | 5/1990 | European Pat. Off. |
| 441 208 | 1/1991 | European Pat. Off. |
| 441 208 A1 | 1/1991 | European Pat. Off. |

*Primary Examiner*—Fiona T. Powers
*Attorney, Agent, or Firm*—Oblon, Spivak, McClelland, Maier & Neustadt, P.C.

[57] ABSTRACT

Azo dyes of the formula

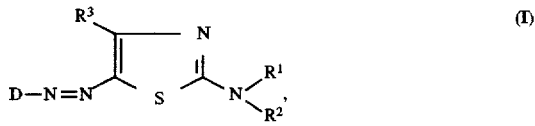

where

D is the radical of a diazo component of the aniline series or the series of the aromatic heterocyclic amines, $R^1$ and $R^2$ are each $C_1$–$C_{10}$-alkyl, which may be substituted, $C_5$–$C_7$-cycloalkyl, $C_3$–$C_4$-alkenyl, substituted or unsubstituted phenyl, or are together with the nitrogen atom joining them together a heterocyclic radical, and $R^3$ is tert-butyl or tert-pentyl, are useful for thermal transfer and for dyeing or printing synthetic materials.

11 Claims, No Drawings

AZO DYES WITH A COUPLING COMPONENT OF THE AMINOTHIAZOLE SERIES

This application is a 371 of PCT/EP95/02866 filed Jul. 20, 1995.

The present invention relates to novel azo dyes of the formula I

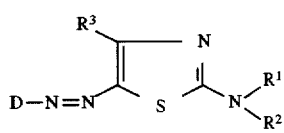

(I)

where $R^1$ and $R^2$ are independently of each other $C_1$–$C_{10}$-alkyl with or without substitution by cyano, hydroxyl, halogen, $C_1$–$C_4$-alkanoyloxy, $C_1$–$C_4$-alkoxycarbonyl, $C_1$–$C_4$-alkoxycarbonyloxy or phenyl and with or without interruption by from 1 to 4 oxygen atoms in ether function, $C_5$–$C_7$-cycloalkyl, $C_3$–$C_4$-alkenyl, unsubstituted or $C_1$–$C_4$-alkyl-, $C_1$–$C_4$-alkoxy- or halogen-substituted phenyl, or $R^1$ and $R^2$ are together with the nitrogen atom joining them together a 5- or 6-membered saturated heterocyclic radical with or without further hetero atoms, $R^3$ is tert-butyl or tert-pentyl, and D is a radical of a diazo component of the aniline series or the series of the aromatic heterocyclic amines, a process for the thermal transfer of these dyes and to their use for dyeing or printing synthetic materials.

EP-A-441 208 discloses azo dyes with a 2-aminothiazole as coupling component.

It is an object of the present invention to provide novel azo dyes which have advantageous application properties in the dyeing or printing of textile materials or in thermal dye transfer.

We have found that this object is achieved by the azo dyes of the formula I defined at the beginning.

Emphasis is given to azo dyes of the formula I where D is derived from a diazo component of the aniline series or from an amine of the pyrrole, thiophene, pyrazole, thiazole, isothiazole, triazole, thiadiazole, benzothiophene, benzothiazole, benzisothiazole, pyridothiophene, pyrimidothiophene or thienothiophene series.

Suitable radicals D conform for example to the formula

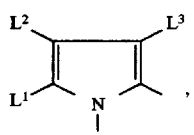 (IIa)

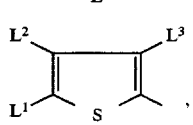 (IIb)

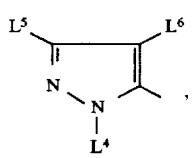 (IIc)

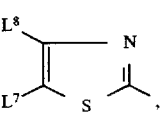 (IId)

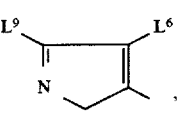 (IIe)

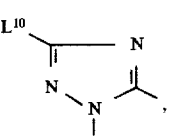 (IIf)

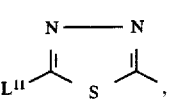 (IIg)

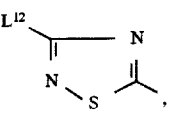 (IIh)

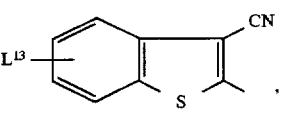 (IIi)

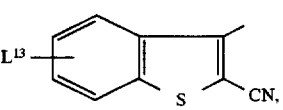 (IIj)

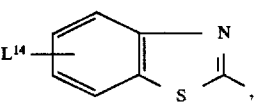 (IIk)

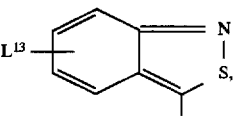 (IIl)

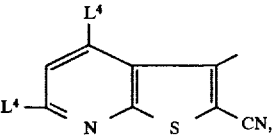 (IIm)

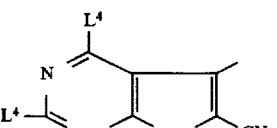 (IIn)

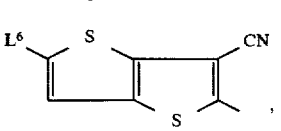 (IIo)

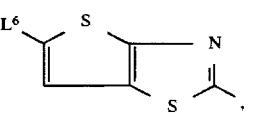 (IIp)

(IIq)

(IIr)

or (IIs)

where $L^1$ is nitro, cyano, $C_1$-$C_6$-alkanoyl, benzoyl, $C_1$-$C_6$-alkoxycarbonyl, $C_1$-$C_8$-alkylsulfonyl, substituted or unsubstituted phenylsulfonyl or a radical of the formula —CH=T, where T is hydroxyimino, $C_1$-$C_4$-alkoxyimino or a radical of an acidic-CH compound $H_2T$, $L^2$ is hydrogen, $C_1$-$C_6$-alkyl, halogen, hydroxyl, mercapto, unsubstituted or phenyl- or $C_1$-$C_4$-alkoxy-substituted $C_1$-$C_6$-alkoxy, substituted or unsubstituted phenoxy, unsubstituted or phenyl-substituted $C_1$-$C_8$-alkylthio, substituted or unsubstituted phenylthio, $C_1$-$C_9$-alkylsulfonyl or substituted or unsubstituted phenylsulfonyl, $L^3$ is cyano, $C_1$-$C_6$-alkoxycarbonyl or nitro, $L^4$ is hydrogen, $C_1$-$C_6$-alkyl or phenyl, $L^5$ is $C_1$-$C_6$-alkyl or phenyl, $L^6$ is hydrogen, cyano, nitro, $C_1$-$C_6$-alkoxycarbonyl, $C_1$-$C_6$-alkanoyl, thiocyanato or halogen, $L^7$ is nitro, cyano, $C_1$-$C_6$-alkanoyl, benzoyl, $C_1$-$C_6$-alkoxycarbonyl, $C_1$-$C_8$-alkylsulfonyl, substituted or unsubstituted phenylsulfonyl or a radical of the formula —CH=T, where T is as defined above, $L^8$ is hydrogen, $C_1$-$C_6$-alkyl, substituted or unsubstituted phenyl, cyano, halogen, unsubstituted or phenyl- or $C_1$-$C_4$-alkoxy-substituted $C_1$-$C_8$-alkoxy, unsubstituted or phenyl-substituted $C_1$-$C_8$-alkylthio, substituted or unsubstituted phenylthio, $C_1$-$C_8$-alkylsulfonyl, substituted or unsubstituted phenylsulfonyl or $C_1$-$C_6$-alkoxycarbonyl, $L^9$ is cyano, unsubstituted or phenyl- or $C_1$-$C_4$-alkoxy-substituted $C_1$-$C_6$-alkyl, unsubstituted or phenyl-substituted $C_1$-$C_8$-alkoxy, unsubstituted or phenyl-substituted $C_1$-$C_8$-alkylthio, substituted or unsubstituted phenyl, thienyl, $C_1$-$C_4$-alkylthienyl, pyridyl or $C_1$-$C_4$-alkylpyridyl or, together with $L^6$, a fused benzo radical, $L^{10}$ is phenyl or pyridyl, $L^{11}$ is trifluoromethyl, nitro, $C_1$-$C_6$-alkyl, phenyl, unsubstituted or phenyl-substituted $C_1$-$C_8$-alkylthio or $C_1$-$C_6$-dialkylamino, $L^{12}$ is unsubstituted or acetyloxy-substituted $C_1$-$C_6$-alkyl, phenyl, unsubstituted or phenyl-substituted $C_1$-$C_8$-alkylthio, 2-cyanoethylthio or 2-($C_1$-$C_6$-alkoxycarbonyl)ethylthio, $L^{13}$ is hydrogen, nitro or halogen, $L^{14}$ is hydrogen, cyano, $C_1$-$C_6$-alkoxycarbonyl, nitro or halogen, $L^{15}$, $L^{16}$ and $L^{17}$ are independently of each other hydrogen, $C_1$-$C_6$-alkyl, $C_1$-$C_6$-alkoxy, halogen, nitro, cyano, unsubstituted or phenoxy-substituted $C_1$-$C_6$-alkoxycarbonyl, $C_1$-$C_8$-alkylsulfonyl or substituted or unsubstituted phenylsulfonyl, or $L^{15}$ and $L^{16}$ are together a radical of the formula CO—NW—CO where W is $C_1$-$C_{10}$-alkyl with or without interruption by 1 or 2 oxygen atoms in ether function and with or without substitution by hydroxyl, $L^{18}$ is hydrogen, methyl or chlorine, and $L^{19}$ is cyano or $C_1$-$C_6$-alkoxycarbonyl.

Any alkyl or alkenyl appearing in the abovementioned formulae may be straight-chain or branched.

In any substituted alkyl appearing in the abovementioned formulae the number of substituents is generally 1 or 2.

Any substituted phenyl appearing in the abovementioned formulae may have as substituents for example, unless otherwise mentioned, $C_1$-$C_8$-alkyl, $C_1$-$C_8$-alkoxy, halogen, especially chlorine or bromine, or nitro.

In any substituted phenyl, furanyl or thienyl appearing in the abovementioned formulae the number of substituents is generally from 1 to 3, preferably 1 or 2.

$L^2$, $L^4$, $L^5$, $L^8$, $L^9$, $L^{11}$, $L^{12}$, $L^{15}$, $L^{16}$, $L^{17}$, $R^1$, $R^2$ and W are each for example methyl, ethyl, propyl, isopropyl, butyl, isobutyl, sec-butyl, tert-butyl, pentyl, isopentyl, neopentyl, tert-pentyl, hexyl or 2-methylpentyl.

$R^1$, $R^2$, $R^6$ and W may each also be for example heptyl, occyl, 2-ethylhexyl, isooctyl, nonyl, isononyl, decyl or isodecyl (the designations isooctyl, isononyl and isodecyl are trivial names derived from the oxo process alcohols—cf. Ullmann's Encyclopedia of Industrial Chemistry, 5th Edition, Vol. A 1, pages 290 to 293, and Vol. A 10, pages 284 and 285).

$R^1$, $R^2$ and $R^6$ may each also be for example cyclopentyl, methylcyclopentyl, dimethylcyclopentyl, cyclohexyl, methylcyclohexyl or cycloheptyl.

$L^9$, $R^1$, $R^2$ and W may each also be for example 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl or 2- or 4-butoxybutyl.

$R^1$, $R^2$ and W may each also be for example 3,6-dioxaheptyl, 3,6-dioxaoctyl, 4,8-dioxanonyl, 3,7-dioxaoctyl, 3,7-dioxanonyl, 4,7-dioxaoetyl, 4,7-dioxanonyl or 4,8-dioxadecyl.

$R^1$ and $R^2$ may each also be for example 3,6,8-trioxadecyl, 3,6,9-trioxaundecyl, 3,6,9,12-tetraoxatridecyl, 3,6,9,12-tetraoxatetradecyl, 2-cyanoethyl, 2- or 3-cyanopropyl, 2- or 4-cyanobutyl, 2-hydroxyethyl, 2- or 3-hydroxypropyl, 2- or 4-hydroxybutyl, 2-chloroethyl, 2- or 3-chloropropyl, 2- or 4-chlorobutyl, 2-acetyloxyethyl, 2- or 3-acetyloxypropyl, 2- or 4-acetyloxybutyl, 2-propionyloxyethyl, 2- or 3-propionyloxypropyl, 2- or 4-propionyloxybutyl, 2-methoxycarbonylethyl, 2-ethoxycarbonylethyl, 2-propoxycarbonylethyl, 2-isopropoxycarbonylethyl, 2-butoxycarbonylethyl, 2- or 3-methoxycarbonylpropyl, 2- or 3-ethoxycarbonylpropyl, 2- or 3-propoxycarbonylpropyl, 2- or 3-butoxycarbonylpropyl, 2- or 4-methoxycarbonylbutyl, 2- or 4-ethoxycarbonylbutyl, 2- or 4-propoxycarbonylbutyl, 2- or 4-butoxycarbonylbutyl, 2-methoxycarbonyloxyethyl, 2-ethoxycarbonyloxyethyl, 2-propoxycarbonyloxyethyl, 2-isopropoxycarbonyloxyethyl, 2-butoxycarbonyloxyethyl, 2- or 3-methoxycarbonyloxypropyl, 2- or 3-ethoxycarbonyloxypropyl, 2- or 3-propoxycarbonyloxypropyl, 2- or 3-butoxycarbonyloxypropyl, 2- or 4-methoxycarbonyloxybutyl, 2- or 4-ethoxycarbonyloxybutyl, 2- or 4-propoxycarbonyloxybutyl, 2- or 4-butoxycarbonyloxybutyl, prop-1-en-3-yl, but-2-en-4-yl or 2-methylprop-1-en-3-yl.

$L^9$, $R^1$ and $R^2$ may each also be for example benzyl or 1- or 2-phenylethyl.

$L^{12}$ may also be for example 2-acetyloxyethyl, 2- or 3-acetyloxypropyl or 2- or 4-acetyloxybutyl.

$L^2$, $L^8$, $L^9$ and $L^{11}$ may each also be for example methylthio, ethylthio, propylthio, isopropylthio, butylthio, isobutylthio, pentylthio, hexylthio, heptylthio, octylthio, 2-ethylhexylthio, benzylthio or 1- or 2-phenylethylthio.

$L^2$ and $L^8$ may each also be for example phenylthio, 2-methylphenylthio, 2-methoxyphenylthio or 2-chlorophenylthio.

$L^2$, $L^8$, $L^9$, $L^{15}$, $L^{16}$ and $L^{17}$ may each also be for example methoxy, ethoxy, propoxy, isopropoxy, butoxy, isobutoxy, sec-butoxy, pentyloxy, isopentyloxy, neopentyloxy, tert-pentyloxy, hexyloxy or 2-methylpentyloxy.

$L^9$ may also be for example benzyloxy or 1- or 2-phenylethoxy.

$L^6$ is and each of $L^2$, $L^8$, $L^{13}$, $L^{14}$, $L^{15}$, $L^{16}$ and $L^{17}$ may further also be for example fluorine, chlorine or bromine.

$L^7$ and $L^1$ are each and each of $L^2$, $L^8$, $L^{15}$, $L^{16}$ and $L^{17}$ may further also be for example methylsulfonyl, ethylsulfonyl, propylsulfonyl, isopropylsulfonyl, butylsulfonyl, isobutylsulfonyl, sec-butylsulfonyl, pentylsulfonyl, isopentylsulfonyl, neopentylsulfonyl, hexylsulfonyl, heptylsulfonyl, octylsulfonyl, 2-ethylhexylsulfonyl, phenylsulfonyl, 2-methylphenylsulfonyl, 2-methoxyphenylsulfonyl or 2-chlorophenylsulfonyl.

$L^3$ is and each of $L^1$, $L^6$, $L^7$, $L^8$, $L^{14}$, $L^{15}$, $L^{16}$, $L^{17}$ and $L^{19}$ may further also be for example methoxycarbonyl, ethoxycarbonyl, propoxycarbonyl, isopropoxycarbonyl, butoxycarbonyl, isobutoxycarbonyl, sec-butoxycarbonyl, pentyloxycarbonyl, isopentyloxycarbonyl, neopentyloxycarbonyl or hexyloxycarbonyl.

$L^{15}$, $L^{16}$ and $L^{17}$ may each also be for example 2-phenoxyethoxycarbonyl, 2- or 3-phenoxypropoxycarbonyl or 2- or 4-phenoxybutoxycarbonyl.

$L^2$ and $L^8$ may each also be for example 2-methoxyethoxy, 2-ethoxyethoxy, 2- or 3-methoxypropoxy, 2- or 3-ethoxypropoxy, 2- or 4-methoxybutoxy, 2- or 4-ethoxybutoxy, 5-methoxypentyloxy, 5-ethoxypentyloxy, 6-methoxyhexyloxy, 6-ethoxyhexyloxy, benzyloxy or 1- or 2-phenylethoxy.

$L^{11}$ may also be for example dimethylamino, diethylamino, dipropylamino, diisopropylamino, dibutylamino, dipentylamino, dihexylamino or N-methyl-N-ethylamino.

$L^{12}$ may also be for example 2-methoxycarbonylethylthio or 2-ethoxycarbonylethylthio.

$L^8$, $L^9$, $R^1$ and $R^2$ may each also be for example phenyl, 2-, 3- or 4-methylphenyl, 2,4-dimethylphenyl, 2-, 3- or 4-methoxyphenyl, 2-, 3- or 4-chlorophenyl or 2-, 3- or 4-nitrophenyl.

$L^9$ may also be for example 2- or 3-methylthienyl or 2-, 3- or 4-methylpyridyl.

$L^1$, $L^6$ and $L^7$ may each also be for example formyl, acetyl, propionyl, butyryl, isobutyryl, pentanoyl or hexanoyl.

In a —CH=T radical $L^1$ or $L^9$ where T is derived from an acidic-CH compound $H_2T$ said acidic CH compound $H_2T$ can for example be a compound of the formula

(IIIa)

(IIIb)

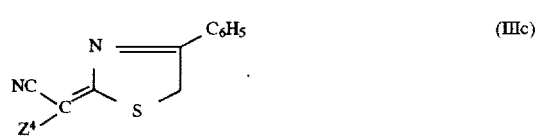

(IIIc)

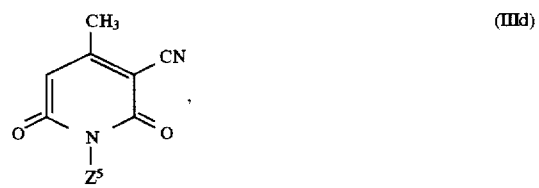

(IIId)

(IIIe)

(IIIf)

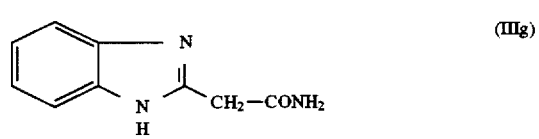

(IIIg)

where $Z^1$ is cyano, nitro, $C_1$–$C_4$-alkanoyl, substituted or unsubstituted benzoyl, $C_1$–$C_4$-alkylsulfonyl, substituted or unsubstituted phenylzulfonyl, $C_1$–$C_4$-alkoxycarbonyl, $C_3$–$C_4$-alkenyloxycarbonyl, phenoxycarbonyl, carbamoyl, mono- or di($C_1$–$C_4$-alkyl)carbamoyl, substituted or unsubstituted phenylcarbamoyl, substituted or unsubstituted phenyl, 2-benzothiazolyl, 2-benzimidazolyl, 5-phenyl-1,3,4-thiadiazol-2-yl or 2-hydroxy-3-quinoxalinyl, $Z^2$ is $C_1$–$C_4$-alkyl, $C_1$–$C_4$-alkoxy or $C_3$–$C_4$-alkenyloxy, $Z^3$ is $C_1$–$C_4$-alkoxycarbonyl, $C_3$–$C_4$-alkenyloxycarbonyl, phenylcarbamoyl or 2-benzimidazolyl, $Z^4$ is cyano, $C_1$–$C_4$-alkoxycarbonyl or $C_3$–$C_4$-alkenyloxycarbonyl, $Z^5$ is hydrogen or $C_1$–$C_6$-alkyl, $Z^6$ is hydrogen, $C_1$–$C_4$-alkyl or phenyl, and $Z^7$ is $C_1$–$C_4$-alkyl.

Attention is drawn to the radical derived from compounds of the formula IIIa, IIIb or IIIc where $Z^1$ is cyano, $C_1$–$C_4$-alkanoyl, $C_1$–$C_4$-alkoxycarbonyl or $C_3$–$C_4$-alkenyloxycarbonyl, $Z^2$ is $C_1$–$C_4$-alkyl, $C_1$–$C_4$-alkoxy or $C_3$–$C_4$-alkenyloxy, $Z^3$ is $C_1$–$C_4$-alkoxycarbonyl or $C_3$–$C_4$-alkenyloxycarbonyl and $Z^4$ is cyano.

Particular attention is drawn to the radical derived from compounds of the formula IIIa, IIIb or IIIc where $Z^1$ is cyano, $C_1$–$C_4$-alkoxycarbonyl or $C_3$–$C_4$-alkenyloxycarbonyl, $Z^2$ is $C_1$–$C_4$-alkoxy or $C_2$–$C_4$-alkenyloxy, $Z^3$ is $C_1$–$C_4$-alkoxycarbonyl or $C_3$–$C_4$-alkenyloxycarbonyl and $Z^4$ is cyano.

$R^1$ and $R^1$ combined with the nitrogen atom joining them together into a five- or six-membered saturated heterocyclic radical with or without further hetero atoms may be for example pyrrolidinyl, piperidinyl, morpholinyl, thiomorpholinyl, thiomorpholinyl S,S-dioxide, piperazinyl or N-($C_1$–$C_4$-alkyl)piperazinyl, such as N-methyl- or N-ethyl-piperazinyl.

Preference is given to azo dyes of the formula I where $R^1$ and $R^2$ are independently of each other $C_1$–$C_8$-alkyl which may be $C_1$–$C_4$-alkoxy-, $C_1$–$C_4$-alkoxycarbonyl- or phenyl-substituted, cyclopentyl, cyclohexyl or prop-1-en-3-yl.

Preference is further given to azo dyes of the formula I where D is a radical of the formula IIb, IId, IIe, IIh or IIq.

Particular preference is given to azo dyes of the formula I where $R^1$ and $R^2$ are independently of each other $C_1$–$C_6$-alkyl with or without substitution by phenyl.

Particular preference is further given to azo dyes of the formula I where $R^3$ is tert-butyl.

Particular preference is further given to azo dyes of the formula I where D is a radical of the formula IIb, IId, IIe, IIh or IIq where $L^1$ is nitro, cyano, formyl or a radical of the formula —CH=T where T is a radical of an acidic-CH compound $H_2T$, $L^2$ is $C_1$–$C_6$-alkyl or halogen, $L^3$ is cyano, $C_1$–$C_6$-alkoxycarbonyl or nitro, $L^6$ is cyano, $L^7$ is nitro, cyano, formyl, $C_1$–$C_6$-alkoxycarbonyl or a radical of the formula —CH=T where T is as defined above, $L^8$ is $C_1$–$C_6$-alkyl, substituted or unsubstituted phenyl, cyano, halogen or $C_1$–$C_6$-alkoxycarbonyl, $L^9$ is unsubstituted or phenyl-substituted $C_1$–$C_6$-alkyl, unsubstituted or phenyl-substituted $C_1$–$C_6$-alkylthio or substituted or unsubstituted phenyl, $L^{12}$ is unsubstituted or phenyl-substituted $C_1$–$C_8$-alkylthio, and $L^{15}$, $L^{16}$ and $L^{17}$ are independently of one another hydrogen, $C_1$–$C_6$-alkyl, $C_1$–$C_6$-alkoxy, nitro, cyano or unsubstituted or phenoxy-substituted $C_1$–$C_6$-alkoxycarbonyl, or $L^{15}$ and $L^{16}$ are together a radical of the formula CO—NW—CO where W is as defined above.

The novel azo dyes of the formula I can be obtained in a conventional manner, for example by conventionally diazotizing a diazo component of the formula IV

D—$NH_2$                                    (IV), where D is as defined above, and coupling the resulting diazonium salt with an aminothiazole of the formula V

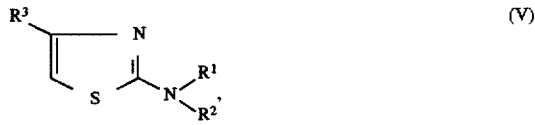

where $R^1$, $R^2$ and $R^3$ are each as defined above.

The present invention further provides a process for transferring dyes from a transfer to plastic-coated paper by diffusion or sublimation by means of an energy source, which comprises using a transfer on which there is or are one or more azo dyes of the formula I.

To make the transfers required for the process of the present invention, the azo dyes of the formula I are incorporated in a suitable organic solvent or a mixture of solvents with one or more binders with or without auxiliaries to form a printing ink. This printing ink preferably contains the dyes in a molecularly disperse, ie. dissolved, form. The printing ink can be applied to the inert support by means of a doctor blade and air dried. Suitable organic solvents for the azo dyes of the formula I include for example those in which the solubility of the dyes at a temperature of 20° C. is greater than 1% by weight, preferably greater than 5% by weight.

Examples are ethanol, propanol, isobutanol, tetrahydrofuran, methylene chloride, methyl ethyl ketone, cyclopentanone, cyclohexanone, toluene, chlorobenzene or mixtures thereof.

Suitable binders include all resins or polymer materials which are soluble in organic solvents and which are capable of binding the azo dyes to the inert support sufficiently firmly as to prevent rubbing off. Preference is given to those binders which, after the air drying of the printing ink, include the dyes in the form of a clear, transparent film without any visible crystallization of the dyes.

Such binders are mentioned for example in U.S. Pat. No. 5,132,438 or the pertinent patent applications cited therein. Also suitable are saturated linear polyesters.

Preferred binders include ethylcellulose, ethylhydroxyethylcellulose, polyvinyl butyral, polyvinyl acetate, cellulose propionate or saturated linear polyesters.

The weight ratio of binder:azo dye generally ranges from 1:2 to 4:1.

Suitable auxiliaries include for example release agents as mentioned in U.S. Pat. No. 5,132,438 or the pertinent patent applications cited therein. Also suitable are especially organic additives which prevent the crystallizing out of the transfer dyes in the course of storage or on heating of the color ribbon, for example cholesterol or vanillin.

Suitable inert supports are described for example in U.S. Pat. No. 5,132,438 or the pertinent patent applications cited therein. The thickness of the support generally ranges from 3 to 30 μm, preferably from 5 to 10 μm.

Suitable dye receiver layers include in principle all thermally stable plastics layers with affinity for the dyes to be transferred, for example modified polycarbonates or polyesters. Further details can be found for example in U.S. Pat. No. 5,132,438 or the pertinent patent applications cited therein.

The transfer is effected by means of an energy source, for example by means of a laser or a thermal head, for which the latter has to be heatable to a temperature of ≥300° C. so that the transfer of the dye can take place within the time range t: 0<t<15 msec. The dye migrates out of the transfer sheet and diffuses into the surface coating of the receiving medium.

The azo dyes of the formula I of the present invention are notable for advantageous application properties. They exhibit high solubility in the color ribbon (good compatibility with the binder), a high stability in the printing ink, good transfer-ability and high image stability (ie. good lightfastness and also good stability to environmental effects, for example moisture, temperature or chemicals), and permit flexible coloristic adaptation to given subtractive primary colors as part of an optimal trichromat (dye mixture).

The novel dyes are also suitable for use as components for black mixtures.

They are also notable in some instances for high brilliance owing to the high transparency in the blue and red parts of the spectrum.

The azo dyes of the formula I of the present invention are also advantageously suitable for dyeing or printing synthetic materials, for example polyesters, polyamides or polycarbonates. Of particular suitability are textile materials, such as fibers, yarns, threads, knits, wovens or nonwovens in polyester, modified polyester, eg. anionically modified polyester, or blends of polyesters with cellulose, cotton, viscose or wool. The dyeing and printing conditions are known per se. The dyes according to the invention can also be used for dyeing keratinous fibers, for example in hair dyeing or the dyeing of skins.

The novel azo dyes of the formula I are also advantageously useful for preparing color filters as described for example in EP-A-399 473.

Finally, they can also be used with advantage as dyes for use in electrophotographic toners.

The Examples which follow illustrate the invention.

A) Preparation

EXAMPLE 1

22.2 g of 3-methyl-4-cyano-5-aminoisothiazole were suspended in 150 ml of 7:3 v/v glacial acetic acid/propionic acid. 6 ml of concentrated sulfuric acid were added, followed at from 0° to 5° C. by the dropwise addition of 48 g of nitrosylsulfuric acid. The mixture was subsequently stirred at from 0° to 50° C. for 3 h. The diazonium salt solution was then added dropwise at from 0° to 5° C. into a solution of 52 g of 2-dibutylamino-4-tert-butylthiazole (82.9% strength by weight) in 100 ml of N,N-dimethylformamide This was followed by buffering with 20 g of sodium acetate. The batch was subsequently stirred at room temperature, and the precipitate was filtered off with suction, washed with methanol and water and dried to leave 55.8 g (83.5% of theory) of the dye of the formula

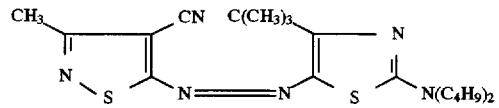

mp.: 202° C.; $\lambda_{max}$ (in THF); 527 nm

EXAMPLE 2

5.2 g of 2,5-dichloro-4-nitroaniline were suspended in 10 g of 96% strength by weight sulfuric acid at from 20° to 30° C. and then admixed at from 15° to 20° C. with 13 g of nitrosylsulfuric acid. This resulting solution was added to 50 ml of water and 100 g of ice, and the batch was subsequently stirred for 15 min and filtered. The filtrate was added dropwise at from 0° to 5° C. to a solution of 9.3 g of 2-dibutylamino-4-tert-butylthiazole in 100 ml of methanol. After stirring overnight at room temperature, the precipitate was filtered off with suction, washed with methanol and water and dried to leave 9.58 g (78.8% of theory) of the dye of the formula

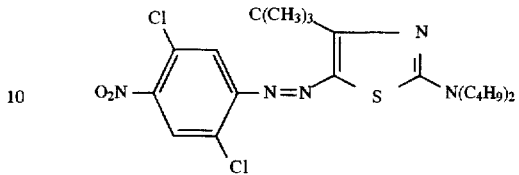

mp.: 164° C.; $\lambda_{max}$ (in THF): 522 nm

EXAMPLE 3

5.2 g of dimethyl 2-aminoterephthalate were suspended in 25 ml of glacial acetic acid and 10 ml of concentrated hydrochloric acid and admixed at from 0° to 5° C. with 8 ml of 23% strength by weight aqueous sodium nitrite solution. The batch was subsequently stirred at from 0° to 5° C. for 1 h and then added at from 0° to 5° C. to a solution of 9.2 g of 2-dibutylamino-4-tert-butylthiazole in 200 ml of methanol. After buffering with 10 g of sodium acetate, the batch was stirred and filtered, and the filter residue was washed with methanol and water and dried to leave 6.23 g (51% of theory) of the dye of the formula

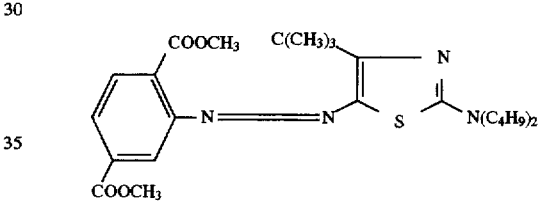

mp.: 74° C.; $\lambda_{max}$ (in THF): 462 nm

The same method can be used to obtain the dyes listed below in Table 1.

TABLE 1

| Ex. No. | D | $X^1$ | $X^2$ | $\lambda_{max}$ [nm] (in $CH_2Cl_2$) |
|---|---|---|---|---|
| 4 | ![Cl, CN, OHC, S structure] | $C(CH_3)_3$ | $N(C_4H_9)_2$ | 587 |
| 5 | ![Cl, CN, CN, C4H9OOC—C=CH, S structure] | $C(CH_3)_3$ | $N(C_4H_9)_2$ | 632 |
| 6 | ![Cl, CN, CN, C4H9OOC—C=CH, S structure] | $C(CH_3)_3$ | $N(C_2H_5)_2$ | 631 |

TABLE 1-continued
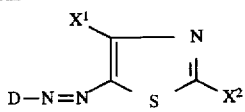
| Ex. No. | D | $X^1$ | $X^2$ | $\lambda_{max}$ [nm] (in $CH_2Cl_2$) |
|---|---|---|---|---|
| 7 | 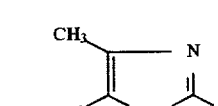 | $C(CH_3)_3$ | $N(C_4H_9)_2$ | 528 |
| 8 | 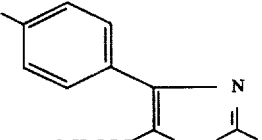 | $C(CH_3)_3$ | $N(CH_2C_6H_5)_2$ | 524 |
| 9 | 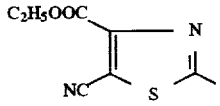 | $C(CH_3)_3$ | $N(C_4H_9)_2$ | 535 |
| 10 | 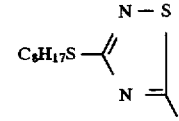 | $C(CH_3)_3$ | $N(C_4H_9)_2$ | 514 |
| 11 | 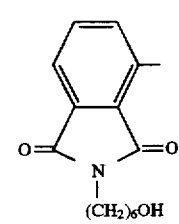 | $C(CH_3)_3$ | $N[CH(CH_3)_2]_2$ | 497 |
| 12 | 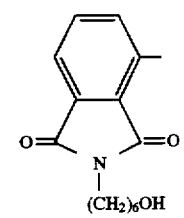 | $C(CH_3)_3$ | $N(CH_3)_2$ | 485 |
| 13 | 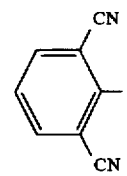 | $CH(CH_3)_3$ | $N(C_4H_9)_2$ | 516 |
| 14 | 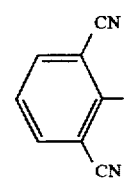 | $C(CH_3)_3$ | $N(C_3H_7)_2$ | 516 |

TABLE 1-continued
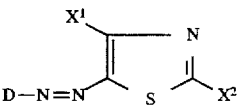
| Ex. No. | D | $X^1$ | $X^2$ | $\lambda_{max}$ [nm] (in $CH_2Cl_2$) |
|---|---|---|---|---|
| 15 | 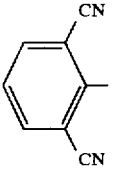 | $C(CH_3)_3$ | $N(C_2H_5)$ | 517 |
| 16 | 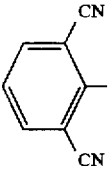 | $C(CH_3)_3$ | $N(CH_3)_2$ | 509 |
| 17 | 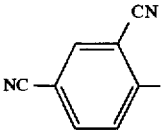 | $C(CH_3)_3$ | $N(C_4H_9)_2$ | 521 |
| 18 | 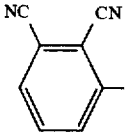 | $C(CH_3)_3$ | $N(C_4H_9)_2$ | 498 |
| 19 | 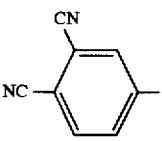 | $C(CH_3)_3$ | $N(C_4H_9)_2$ | 513 |
| 20 | 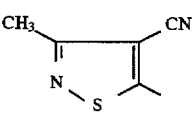 | $C(CH_3)_3$ | $N(CH_2C_6H_5)_2$ | 527 |
| 21 | 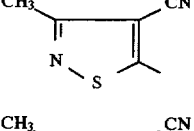 | $C(CH_3)_3$ | $N(C_3H_7)_2$ | 524 |
| 22 | 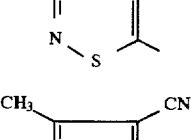 | $C(CH_3)_3$ | $N(CH_3)_2$ | 528 |
| 23 | 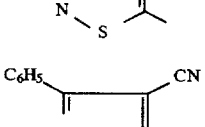 | $C(CH_3)_3$ | $N(C_2H_5)_2$ | 528 |
| 24 | 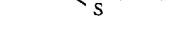 | $C(CH_3)_3$ | 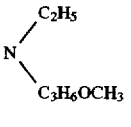 | 533 |

TABLE 1-continued
$$D-N=N \begin{matrix} X^1 \\ | \\ S \end{matrix} \begin{matrix} N \\ \| \\ X^2 \end{matrix}$$
| Ex. No. | D | $X^1$ | $X^2$ | $\lambda_{max}$ [nm] (in $CH_2Cl_2$) |
|---|---|---|---|---|
| 25 | 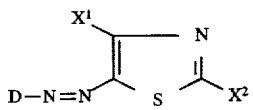 | $C(CH_3)_3$ | 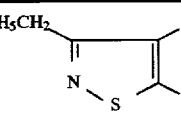 | 531 |
| 26 | 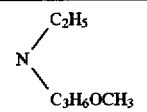 | $C(CH_3)_3$ | 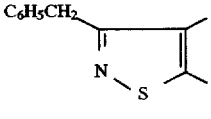 | 533 |
| 27 | 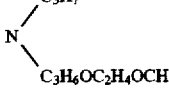 | $C(CH_3)_3$ | 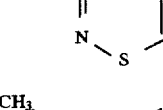 | 527 |
| 28 | 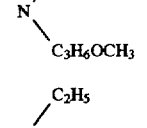 | $C(CH_3)_3$ | 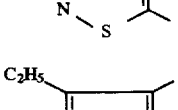 | 528 |
| 29 | 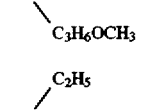 | $C(CH_3)_3$ | 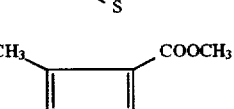 | 528 |
| 30 | 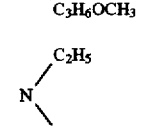 | $C(CH_3)_3$ | 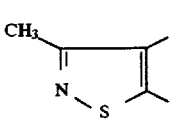 | 541 |
| 31 | 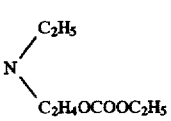 | $C(CH_3)_3$ | 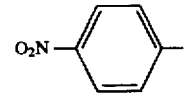 | 527 |
| 32 | 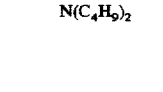 | $C(CH_3)_3$ | $N(C_4H_9)_2$ | 518 |
| 33 | 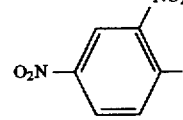 | $C(CH_3)_3$ | $N(C_4H_9)_2$ | 550 |
| 34 | 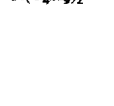 | $C(CH_3)_3$ | $N(CH_3)_2$ | 463 |
| 35 | 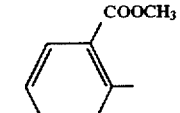 | $C(CH_3)_3$ | $N(C_4H_9)_2$ | 535 |

TABLE 1-continued
$$\begin{array}{c} X^1 \quad N \\ \diagdown \quad \diagup \\ D-N=N \quad S \quad X^2 \end{array}$$
| Ex. No. | D | $X^1$ | $X^2$ | $\lambda_{max}$ [nm] (in $CH_2Cl_2$) |
|---|---|---|---|---|
| 36 | 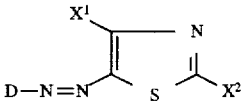 | $C(CH_3)_3$ | $N(C_2H_5)_2$ | 531 |
| 37 | 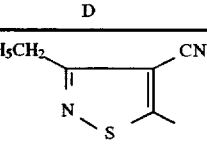 | $C(CH_3)_3$ | $N(C_4H_9)_2$ | 537 |
| 38 | 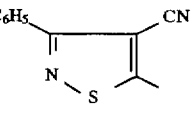 | $C(CH_3)_3$ | $N(C_2H_5)_2$ | 533 |
| 39 | 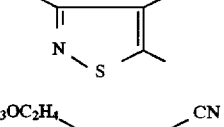 | $C(CH_3)_3$ | $N(C_4H_9)_2$ | 531 |
| 40 | 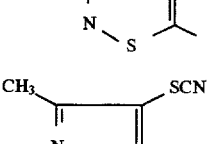 | $C(CH_3)_3$ | $N(CH_2C_6H_5)_2$ | 515 |
| 41 | 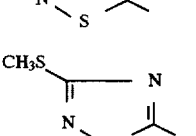 | $C(CH_3)_3$ | $N(C_4H_9)_2$ | 515 |
| 42 | 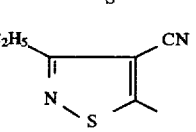 | $C(CH_3)_3$ | $N(C_2H_5)_2$ | 528 |
| 43 | 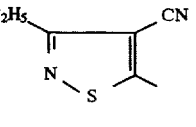 | $C(CH_3)_3$ | $N(C_4H_9)_2$ | 531 |
| 44 | 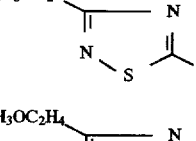 | $C(CH_3)_3$ | $N(C_4H_9)_2$ | 514 |
| 45 | 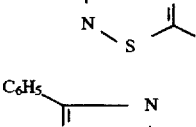 | $C(CH_3)_3$ | $N(C_4H_9)_2$ | 515 |
| 46 | 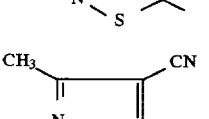 | $C(CH_3)_3$ | $N(C_4H_9)_2$ | 512 |
| 47 | 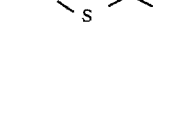 | $C(CH_3)_3$ |  | 524 |

TABLE 1-continued
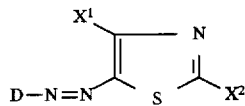
| Ex. No. | D | $X^1$ | $X^2$ | $\lambda_{max}$ [nm] (in $CH_2Cl_2$) |
|---|---|---|---|---|
| 48 | 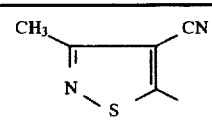 | $C(CH_3)_3$ | 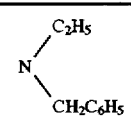 | 529 |
| 49 | 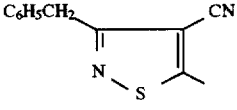 | $C(CH_3)_3$ | $N(C_3H_7)_2$ | 531 |
| 50 | 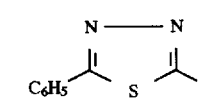 | $C(CH_3)_3$ | $N(C_4H_9)_2$ | 515 |
| 51 | 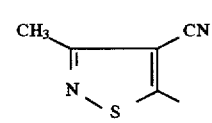 | $C(CH_3)_3$ | 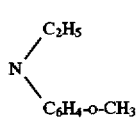 | 524 |
| 52 | 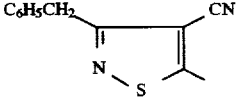 | $C(CH_3)_3$ | 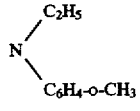 | 527 |
| 53 | 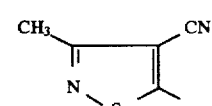 | $C(CH_3)_3$ | 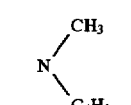 | 528 |
| 54 | 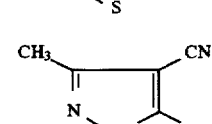 | $C(CH_3)_3$ | 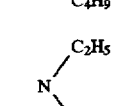 | 528 |
| 55 | 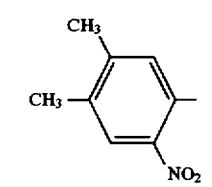 | $C(CH_3)_3$ | $N(C_4H_9)_2$ | 480 |
| 56 | 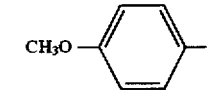 | $C(CH_3)_3$ | $N(CH_3)_2$ | 454 |
| 57 | 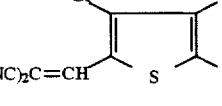 | $C(CH_3)_3$ | $N(C_4H_9)_2$ | 648 |
| 58 | 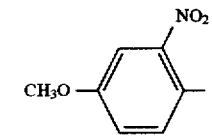 | $C(CH_3)_3$ | $N(C_4H_9)_2$ | 481 |

TABLE 1-continued $$D-N=N-\underset{S}{\overset{X^1}{\underset{|}{C}}=\overset{N}{\underset{\parallel}{C}}-C-X^2}$$

| Ex. No. | D | $X^1$ | $X^2$ | $\lambda_{max}$ [nm] (in $CH_2Cl_2$) |
|---|---|---|---|---|
| 59 | 3-methoxyphenyl | $C(CH_3)_3$ | $N(C_4H_9)_2$ | 460 |
| 60 | 4-methoxyphenyl | $C(CH_3)_3$ | $N(C_4H_9)_2$ | 460 |
| 61 | 2-methoxyphenyl | $C(CH_3)_3$ | $N(C_4H_9)_2$ | 468 |
| 62 | 3-methylphenyl | $C(CH_3)_3$ | $N(C_4H_9)_2$ | 456 |
| 63 | 3-methyl-4-methoxycarbonyl-5-cyano-thien-2-yl | $C(CH_3)_3$ | $N(C_4H_9)_2$ | 544 |
| 64 | 3-methyl-4-bromo-5-methyl-isothiazol-yl | $C(CH_3)_3$ | $N(C_4H_9)_2$ | 506 |
| 65 | 3-methyl-5-methyl-isothiazol-yl | $C(CH_3)_3$ | $N(C_4H_9)_2$ | 490 |
| 66 | 3,5-dimethyl-1,2,4-thiadiazol-yl | $C(CH_3)_3$ | $N(C_4H_9)_2$ | 491 |
| 67 | 3-methyl-4-ethoxycarbonyl-5-cyano-thien-2-yl | $C(CH_3)_3$ | $N(C_2H_5)_2$ | 543 |
| 68 | 3-methyl-4-methoxycarbonyl-5-cyano-thien-2-yl | $C(CH_3)_3$ | $N(C_2H_5)(C_3H_6OCH_3)$ | 541 |
| 69 | 3-methyl-4-methoxycarbonyl-5-cyano-thien-2-yl | $C(CH_3)_3$ | $N(C_3H_7)_2$ | 542 |

TABLE 1-continued $$D-N=N-\underset{S}{\overset{X^1}{\underset{\|}{C}}}\underset{}{\overset{N}{\underset{}{=}}}C-X^2$$

| Ex. No. | D | $X^1$ | $X^2$ | $\lambda_{max}$ [nm] (in $CH_2Cl_2$) |
|---|---|---|---|---|
| 70 | 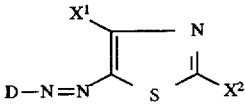 ($C_2H_5OOC$, NC, N, S) | $C(CH_3)_3$ | $N(C_4H_9)_2$ | 535 |
| 71 | 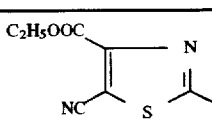 ($CH_3$, $C_2H_5OOC$, N, S) | $C(CH_3)_3$ | $N(C_4H_9)_2$ | 528 |
| 72 | 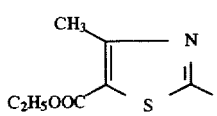 | $C(CH_3)_3$ | $N(C_2H_5)_2$ | 548 |
| 73 | 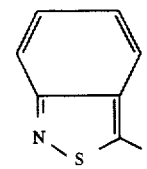 ($CH_3$, SCN, N, S) | $C(CH_3)_3$ | $N(C_4H_9)_2$ | 524 |
| 74 | 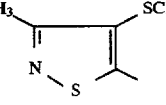 (Cl, OHC, N, S) | $C(CH_3)_3$ | $N(C_4H_9)_2$ | 558 |
| 75 | 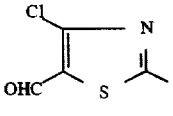 ($O_2N$, N, S) | $C(CH_3)_3$ | $N(C_4H_9)_2$ | 576 |
| 76 | 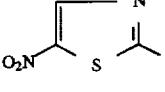 (NC, NC, N, N–$C_6H_{13}$) | $C(CH_3)_2C_2H_5$ | $N(C_2H_5)_2$ | |
| 77 | 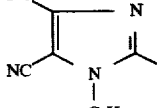 ($(CH_3)_3C$, CN, N, N–$CH_2C_6H_5$) | $C(CH_3)_3$ | $N(C_4H_9)_2$ | |

B) Use in thermal transfer

Method for thermal transfer a) 10 g of dye are stirred, if necessary with brief heating to 80°–90° C., into 100 g of a 10% strength by weight solution of a binder in 4.5:2:2 v/v/v methyl ethyl ketone/toluene/cyclohexanone.

The mixture is applied with a 6 μm doctor blade to a 6 μm thick polyester film which has a suitable slipping layer on the back and is blown dry with a hair dryer in the course of 1 minute. Before the color ribbon can be printed, it has to be air dried for at least a further 24 hours, since residual solvent can impair the printing process.

b) The color ribbons are printed on an experimental computer-controlled apparatus equipped with a commercial thermal printing head onto commercial color videoprint paper (Hitachi).

The voltage is altered to control the energy emitted by the thermal printing head, the length of a pulse having been set to 7 ms and only one pulse being emitted at a time. The emitted energy level ranges from 0.7 to 2.0 mJ/dot.

Since the depth of the color is directly proportional to the supplied energy, it is possible to use a color wedge for spectroscopic evaluation.

The depth of the color is plotted against the supplied energy per heating element to determine the Q* value (=energy in mJ for the absorbance value of 1) and the gradient m in 1/mJ.

The results obtained are shown together with the $\lambda_{max}$ values (measured on the videoprint paper) below in Table 2.

The binder used in each case was a product based on a saturated linear polyester and on polyvinyl butyral, the first value of Q* and m in the table for each example being measured with the polyester as binder and the second with polyvinyl butyral as binder.

TABLE 2

| Dye No. | Q* [mJ/Dot] | m [l/mJ] | $\lambda_{max}$ [nm] |
|---|---|---|---|
| 1 | 0.87 | 3.00 | 534 |
|  | 0.93 | 2.40 |  |
| 4 | 1.05 | 2.17 | 582 |
|  | 1.07 | 2.31 |  |
| 5 | 1.20 | 1.75 | 637 |
|  | 1.32 | 1.06 |  |
| 7 | 0.89 | 2.96 | 531 |
|  | 1.02 | 1.78 |  |
| 8 | 1.38 | 1.38 | 528 |
|  | 1.84 | 0.82 |  |
| 9 | 0.89 | 2.86 | 540 |
|  | 0.95 | 2.30 |  |
| 10 | 1.00 | 1.22 | 518 |
|  | 0.99 | 2.11 |  |
| 11 | 1.00 | 1.97 | 492 |
|  | 1.10 | 1.69 |  |
| 12 | 0.99 | 2.05 | 485 |
|  | 1.07 | 1.85 |  |
| 13 | 0.99 | 2.02 | 540 |
|  | 0.97 | 2.08 |  |
| 14 | 0.86 | 2.70 | 520 |
|  | 0.94 | 2.40 |  |
| 15 | 0.78 | 2.80 | 515 |
|  | 0.94 | 3.56 |  |
| 16 | 1.01 | 2.01 | 515 |
|  | 1.13 | 1.74 |  |
| 17 | 0.89 | 3.70 | 523 |
|  | 1.01 | 2.63 |  |
| 18 | 0.91 | 3.29 | 502 |
|  | 0.98 | 2.60 |  |
| 19 | 0.92 | 3.12 | 515 |
|  | 1.01 | 2.50 |  |
| 20 | 0.92 | 2.80 | 530 |
|  | 0.98 | 2.50 |  |
| 21 | 0.89 | 2.14 | 527 |
|  | 1.13 | 1.71 |  |
| 23 | 0.86 | 3.12 | 534 |
|  | 0.87 | 3.12 |  |
| 24 | 0.96 | 2.20 | 537 |
|  | 1.07 | 1.95 |  |
| 25 | 0.87 | 3.03 | 537 |
|  | 0.92 | 2.59 |  |
| 26 | 0.92 | 2.24 | 537 |
|  | 0.99 | 2.32 |  |
| 27 | 0.86 | 2.85 | 535 |
|  | 0.85 | 2.79 |  |
| 28 | 0.85 | 3.34 | 531 |
|  | 0.90 | 3.21 |  |
| 29 | 0.85 | 3.14 | 532 |
|  | 0.90 | 3.04 |  |
| 30 | 0.87 | 2.85 | 549 |
|  | 1.01 | 2.04 |  |
| 31 | 0.91 | 3.00 | 531 |
| 32 | 0.79 | 2.74 | 518 |
| 33 | 0.83 | 3.63 | 554 |
| 34 | 1.02 | 2.06 | 458 |
| 35 | 0.90 | 2.56 | 536 |
|  | 0.89 | 2.42 |  |
| 36 | 0.88 | 2.87 | 535 |
|  | 0.92 | 2.50 |  |
| 37 | 0.92 | 2.56 | 540 |
|  | 0.92 | 2.20 |  |
| 38 | 0.90 | 2.68 | 536 |
|  | 0.90 | 2.71 |  |
| 39 | 0.88 | 2.34 | 537 |
|  | 0.95 | 2.28 |  |
| 40 | 1.10 | 1.61 | 518 |
|  | 1.07 | 1.66 |  |
| 41 | 0.89 | 2.65 | 514 |
|  | 0.96 | 2.08 |  |
| 42 | 0.85 | 2.88 | 529 |
|  | 0.92 | 2.85 |  |
| 43 | 0.86 | 3.39 | 531 |
|  | 0.86 | 3.36 |  |
| 44 | 0.91 | 2.26 | 516 |
|  | 0.96 | 2.34 |  |
| 45 | 0.90 | 2.44 | 520 |
|  | 1.02 | 2.01 |  |
| 46 | 0.95 | 2.44 | 514 |
|  | 0.99 | 2.31 |  |
| 47 | 0.87 | 3.43 | 531 |
|  | 0.93 | 2.75 |  |
| 48 | 0.95 | 2.38 | 534 |
|  | 0.92 | 2.65 |  |
| 49 | 0.90 | 2.98 | 534 |
|  | 0.96 | 2.45 |  |
| 50 | 0.86 | 3.14 | 515 |
|  | 0.88 | 3.04 |  |
| 51 | 0.92 | 2.48 | 527 |
|  | 0.96 | 2.61 |  |
| 52 | 1.04 | 1.89 | 531 |
|  | 1.15 | 1.66 |  |
| 53 | 0.83 | 3.25 | 530 |
|  | 0.90 | 2.93 |  |
| 54 | 0.81 | 4.30 | 531 |
|  | 0.88 | 3.07 |  |
| 55 | 0.96 | 2.35 | 476 |
|  | 1.04 | 2.09 |  |
| 56 | 0.88 | 2.71 | 446 |
|  | 0.97 | 2.40 |  |
| 57 | 1.17 | 1.45 | 654 |
| 58 | 0.91 | 2.48 | 477 |
|  | 1.00 | 2.09 |  |
| 59 | 1.05 | 1.66 | 445 |
|  | 1.12 | 1.46 |  |
| 60 | 1.04 | 1.54 | 459 |
|  | 1.08 | 1.70 |  |
| 61 | 1.14 | 1.53 | 440 |
|  | 1.17 | 1.66 |  |
| 62 | 1.31 | 1.30 | 441 |
|  | 1.37 | 1.13 |  |
| 63 | 0.91 | 3.11 | 550 |
| 64 | 0.86 | 3.09 | 508 |
|  | 0.94 | 2.63 |  |
| 65 | 0.86 | 2.87 | 489 |
|  | 0.94 | 2.42 |  |
| 66 | 0.82 | 3.61 | 494 |
|  | 0.83 | 3.11 |  |
| 67 | 0.87 | 3.14 | 546 |
|  | 0.94 | 2.66 |  |
| 68 | 0.87 | 2.85 | 549 |
|  | 1.01 | 2.04 |  |
| 69 | 0.94 | 2.38 | 545 |
| 70 | 0.89 | 2.86 | 540 |
|  | 0.95 | 2.30 |  |
| 71 | 0.89 | 2.86 | 531 |
|  | 1.02 | 1.78 |  |
| 72 | 0.79 | 3.33 | 552 |
|  | 0.89 | 2.77 |  |
| 73 | 0.84 | 2.92 | 524 |
|  | 0.91 | 2.28 |  |
| 74 | 0.86 | 2.54 | 563 |
|  | 0.94 | 2.49 |  |
| 75 | 0.82 | 4.01 | 582 |
|  | 0.87 | 2.98 |  |
| 76 | 0.86 | 3.40 |  | c) Use in dyeing 10 g of polyester fabric are introduced at a temperature of 50° C. into 200 ml of a dyeing liquor which contains X% by weight, based on fiber, of dye and whose pH has been adjusted to 4.5 with acetic acid. After 5 min at 50° C., the temperature of the liquor is raised over 30 min to 130° C..

held at that level for 60 min and then brought back down over 20 min to 60° C.

The dyed polyester fabric is then reduction cleared by treating it at 65° C. for 15 min in 200 ml of a liquor containing 5 ml/l of 32% strength by weight sodium hydroxide solution, 3 g/l of sodium dithionite and 1 g/l of an addition product of 48 mol of ethylene oxide with 1 mol of castor oil. Finally the fabric is rinsed, neutralized with dilute acetic acid, rinsed once more and dried.

Dyes 1 and 20 gave the following results:

Dye 1

Dye quantity (X): 0.26% by weight
HGD: 358.9
Chroma: 54
Light fastness: 6–7

Dye 20

Dye quantity (X): 0.29% by weight
HGD: 351.7
Chroma: 54.9
Light fastness: 6–7

We claim:

1. An Azo dye of the formula I

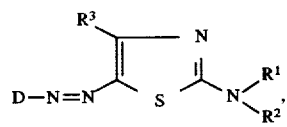
(I)

where

R$^1$ and R$^2$ are independently of each other C$_1$–C$_{10}$-alkyl with or without substitution by cyano, hydroxyl, halogen, C$_1$–C$_4$-alkanoyloxy, C$_1$–C$_4$-alkoxycarbonyl, C$_1$–C$_4$-alkoxycarbonyloxy or phenyl and with or without interruption by from 1 to 4 oxygen atoms in ether function, C$_5$–C$_7$-cyloalkyl, C$_3$–C$_6$-alkenyl, unsubstituted or C$_1$–C$_4$-alkyl-, C$_1$–C$_4$-alkoxy- or halogen-substituted phenyl, or R$^1$ and R$^2$ are together with the nitrogen atom joining them together a 5- or 6-membered saturated heterocyclic radical with or without further hetero atoms, R$^3$ is tert-butyl or tert-pentyl, and D is a radical of a diazo component of the aniline series or the series of the aromatic heterocyclic amines.

2. The azo dye as claimed in claim 1 wherein D is derived from a diazo component of the aniline series or from an amine of the pyrrole, thiophene, pyrazole, thiazole, isothiazole, triazole, thiadiazole, benzothiophene, benzothiazole, benzisothiazole, pyridothiophene, pyrimidothiophene or thienothiophene series.

3. The azo dye as claimed in claim 1 wherein D is a radical of the formula

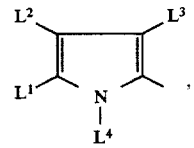
(IIa)

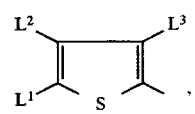
(IIb)

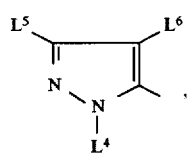
(IIc)

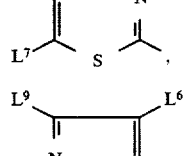
(IId)

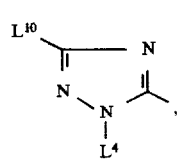
(IIe)

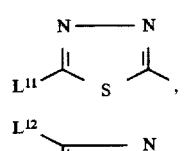
(IIf)

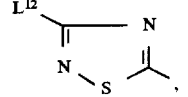
(IIg)

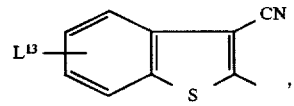
(IIh)

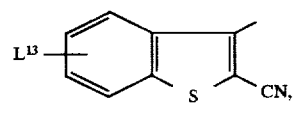
(IIi)

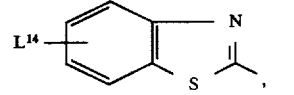
(IIj)

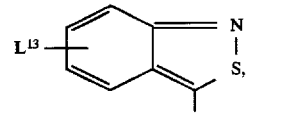
(IIk)

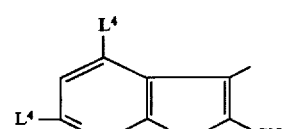
(II)

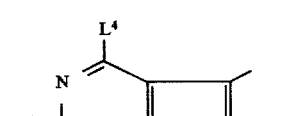
(IIm)

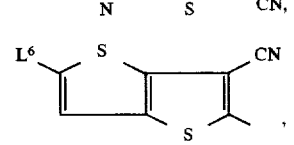
(IIn)

(IIo)

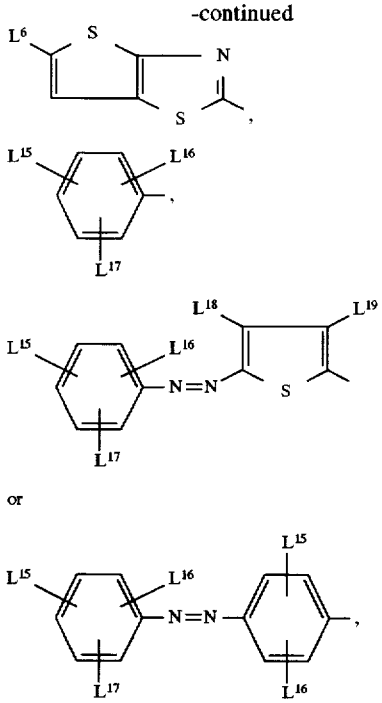

where

- $L^1$ is nitro, cyano, $C_1$-$C_6$-alkanoyl, benzoyl, $C_1$-$C_6$-alkoxycarbonyl, $C_1$-$C_8$-alkylsulfonyl, substituted or unsubstituted phenylsulfonyl or a radical of the formula —CH=T, where T is hydroxyimino, $C_1$-$C_4$-alkoxyimino or a radical of an acidic-CH compound $H_2T$,
- $L^2$ is hydrogen, $C_1$-$C_6$-alkyl, halogen, hydroxyl, mercapto, unsubstituted or phenyl- or $C_1$-$C_4$-alkoxy-substituted $C_1$-$C_6$-alkoxy, substituted or unsubstituted phenoxy, unsubstituted or phenyl-substituted $C_1$-$C_8$-alkylthio, substituted or unsubstituted phenylthio, $C_1$-$C_9$-alkylsulfonyl or substituted or unsubstituted phenylsulfonyl,
- $L^3$ is cyano, $C_1$-$C_6$-alkoxycarbonyl or nitro,
- $L^4$ is hydrogen, $C_1$-$C_6$-alkyl or phenyl,
- $L^5$ is $C_1$-$C_6$-alkyl or phenyl,
- $L^6$ is hydrogen, cyano, nitro, $C_1$-$C_6$-alkoxycarbonyl, $C_1$-$C_6$-alkanoyl, thiocyanato or halogen,
- $L^7$ is nitro, cyano, $C_1$-$C_6$-alkanoyl, benzoyl, $C_1$-$C_6$-alkoxycarbonyl, $C_1$-$C_8$-alkylsulfonyl, substituted or unsubstituted phenylsulfonyl or a radical of the formula —CH=T, where T is as defined above,
- $L^8$ is hydrogen, $C_1$-$C_6$-alkyl, substituted or unsubstituted phenyl, cyano, halogen, unsubstituted or phenyl- or $C_1$-$C_4$-alkoxy-substituted $C_1$-$C_6$-alkoxy, unsubstituted or phenyl-substituted $C_1$-$C_8$-alkylthio, substituted or unsubstituted phenylthio, $C_1$-$C_8$-alkylsulfonyl, substituted or unsubstituted phenylsulfonyl or $C_1$-$C_6$-alkoxycarbonyl,
- $L^9$ is cyano, unsubstituted or phenyl- or $C_1$-$C_4$-alkoxy-substituted $C_1$-$C_6$-alkyl, unsubstituted or phenyl-substituted $C_1$-$C_8$-alkoxy, unsubstituted or phenyl-substituted $C_1$-$C_8$-alkylthio, substituted or unsubstituted phenyl, thienyl, $C_1$-$C_4$-alkylthienyl, pyridyl or $C_1$-$C_4$-alkylpyridyl,
- $L^{10}$ is phenyl or pyridyl,
- $L^{11}$ is trifluoromethyl, nitro, $C_1$-$C_6$-alkyl, phenyl, unsubstituted or phenyl-substituted $C_1$-$C_8$-alkylthio or $C_1$-$C_6$-dialkylamino,
- $L^{12}$ is unsubstituted or acetyloxy-substituted $C_1$-$C_6$-alkyl, phenyl, unsubstituted or phenyl-substituted $C_1$-$C_8$-alkylthio, 2-cyanoethylthio or 2-($C_1$-$C_6$-alkoxycarbonyl)ethylthio,
- $L^{13}$ is hydrogen, nitro or halogen,
- $L^{14}$ is hydrogen, cyano, $C_1$-$C_6$-alkoxycarbonyl, nitro or halogen,
- $L^{15}$, $L^{16}$ and $L^{17}$ are independently of each other hydrogen, $C_1$-$C_6$-alkyl, $C_1$-$C_6$-alkoxy, halogen, nitro, cyano, unsubstituted or phenoxy-substituted $C_1$-$C_6$-alkoxycarbonyl, $C_1$-$C_8$-alkylsulfonyl or substituted or unsubstituted phenylsulfonyl, or $L^{15}$ and $L^{16}$ are together a radical of the formula CO—NW—CO where W is $C_1$-$C_{10}$-alkyl with or without interruption by 1 or 2 oxygen atoms in ether function and with or without substitution by hydroxyl,
- $L^{18}$ is hydrogen, methyl or chlorine, and
- $L^{19}$ is cyano or $C_1$-$C_6$-alkoxycarbonyl.

4. The azo dye as claimed in any of claims 1 to 3 wherein $R^1$ and $R^2$ are independently of each other $C_1$-$C_8$-alkyl which may be $C_1$-$C_4$-alkoxy-, $C_1$-$C_4$-alkoxycarbonyl- or phenyl-substituted, cyclopentyl, cyclohexyl or prop-1-en-3-yl.

5. The azo dye as claimed in claim 3 wherein D is a radical of the formula IIb, IId, IIe, IIh or IIq.

6. The azo dye as claimed in claim 1 wherein $R^1$ and $R^2$ are independently of each other $C_1$-$C_6$-alkyl with or without substitution by phenyl.

7. The azo dye as claimed in claim 1 wherein $R^3$ is tert-butyl.

8. The azo dye as claimed in claim 3 wherein D is a radical of the formula IIb, IId, Ie, IIh or IIq where

- $L^1$ is nitro, cyano, formyl or a radical of the formula —C=T where T is a radical of an acidic-CH compound $H_2T$,
- $L^2$ is $C_1$-$C_6$-alkyl or halogen,
- $L^3$ is cyano, $C_1$-$C_6$-alkoxycarbonyl or nitro,
- $L^6$ is cyano,
- $L^7$ is nitro, cyano, formyl, $C_1$-$C_6$-alkoxycarbonyl or a radical of the formula —CH=T where T is as defined above,
- $L^8$ is $C_1$-$C_6$-alkyl, substituted or unsubstituted phenyl, cyano, halogen or $C_1$-$C_6$-alkoxycarbonyl,
- $L^9$ is unsubstituted or phenyl-substituted $C_1$-$C_6$-alkyl, unsubstituted or phenyl-substituted $C_1$-$C_6$-alkylthio or substituted or unsubstituted phenyl,
- $L^{12}$ is unsubstituted or phenyl-substituted $C_1$-$C_8$-alkylthio, and
- $L^{15}$, $L^{16}$ and $L^{17}$ are independently of one another hydrogen, $C_1$-$C_6$-alkyl, $C_1$-$C_6$-alkoxy, nitro, cyano or unsubstituted or phenoxy-substituted $C_1$-$C_6$-alkoxycarbonyl, or $L^{15}$ and $L^{16}$ are together a radical of the formula CO—NW—CO where W is as defined in claim 3.

9. An azo dye of the formula

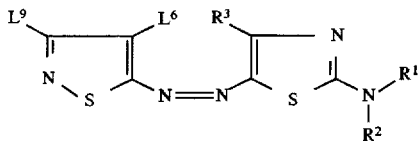

wherein $R^1$ and $R^2$ are each independently a $C_{1-10}$ alkyl;

$R^3$ is tert-butyl;

$L^6$ is cyano; and $L^9$ is cyano, unsubstituted or phenyl- or $C_{1-4}$ alkoxy-substituted $C_{1-16}$ alkyl, unsubstituted or phenyl-substituted $C_{1-8}$ alkoxy, unsubstituted or phenyl-substituted $C_{1-8}$ alkylthio, substituted or unsubstituted phenyl, thienyl, $C_{1-4}$ alkylthienyl, pyridyl or $C_{1-4}$ alkylpyridyl, or together with $L^6$, a fused benzo radical.

10. A process for transferring dyes from a transfer to plastic-coated paper by diffusion or sublimation by means of an energy source, which comprises using a transfer on which there is or are one or more azo dyes as claimed in claim 1.

11. A method of dyeing or printing a synthetic material, comprising applying the azo dye of claim 1 to a synthetic material.

\* \* \* \* \*